United States Patent
Bruce et al.

(10) Patent No.: US 7,628,434 B2
(45) Date of Patent: Dec. 8, 2009

(54) VACUUM-OPERATED VEHICLE GLASS HANDLING SYSTEM

(75) Inventors: Daniel Pieter Bruce, Kenton, OH (US); George Eugene Twaddle, Marysville, OH (US); Stephen C. Dunbar, Fairborn, OH (US)

(73) Assignee: Honda Motor Co., Ltd., Tokyo (JP)

( * ) Notice: Subject to any disclaimer, the term of this patent is extended or adjusted under 35 U.S.C. 154(b) by 460 days.

(21) Appl. No.: 11/485,533

(22) Filed: Jul. 12, 2006

(65) Prior Publication Data

US 2008/0011918 A1    Jan. 17, 2008

(51) Int. Cl.
B25J 15/06    (2006.01)
(52) U.S. Cl. .............................. 294/65; 294/907; 269/21
(58) Field of Classification Search ................ 294/64.1, 294/65, 907; 414/627, 737; 901/40; 269/21
See application file for complete search history.

(56) References Cited

U.S. PATENT DOCUMENTS

| | | | | |
|---|---|---|---|---|
| 2,890,077 A | * | 6/1959 | Littell | .......................... 294/65 |
| 3,423,119 A | * | 1/1969 | Stanley | .......................... 294/65 |
| 4,511,387 A | | 4/1985 | Kellar et al. | |
| 4,685,714 A | * | 8/1987 | Hoke | .......................... 294/81.2 |
| 4,932,701 A | | 6/1990 | Cornillier et al. | |
| 4,957,318 A | | 9/1990 | Blatt | |
| 5,217,273 A | | 6/1993 | Hendricsen et al. | |
| 5,290,082 A | | 3/1994 | Palmer et al. | |
| 5,387,068 A | * | 2/1995 | Pearson | .......................... 414/404 |
| 5,556,505 A | | 9/1996 | Hill | |
| 5,609,377 A | * | 3/1997 | Tanaka | .......................... 294/65 |
| 5,795,001 A | | 8/1998 | Burke | |
| 6,024,392 A | | 2/2000 | Blatt | |
| 6,024,529 A | * | 2/2000 | Kristensen | .................... 414/607 |
| 6,042,670 A | | 3/2000 | Kuribayashi et al. | |
| 6,072,157 A | | 6/2000 | Klebanoff et al. | |
| 6,467,824 B2 | * | 10/2002 | Bolotin et al. | ............. 294/64.1 |
| 6,626,629 B2 | * | 9/2003 | Herbermann et al. | ........ 414/737 |
| 6,979,032 B2 | * | 12/2005 | Damhuis | ....................... 294/65 |
| 7,281,739 B2 | * | 10/2007 | Kniss | ............................ 294/65 |
| 2004/0003488 A1 | | 1/2004 | Thompson | |

* cited by examiner

*Primary Examiner*—Dean J Kramer
(74) *Attorney, Agent, or Firm*—Mark E. Duell; Rankin, Hill & Clark LLP

(57) ABSTRACT

A vacuum-operated vehicle glass handling system includes a plurality of suction cups movably disposed on a frame. A powered vacuum source is fluidly connected to the plurality of suction cups for providing a vacuum at each of the plurality of suction cups. A powered vacuum source includes a pair of vacuum pumps both fluidly connected to the plurality of suction cups for redundantly providing the vacuum to the plurality of suction cups. A power source is selectively electrically connected to the powered vacuum source. A pair of vacuum actuators is on the frame for selectively electrically connecting the power source to the powered vacuum source so the powered vacuum source can provide the vacuum at the plurality of suction cups. The power source is electrically connected to the powered vacuum source upon actuation of one or both of the pair of vacuum actuators. A pair of release actuators is on the frame for selectively releasing the vacuum provided at the plurality of suction cups. The vacuum is released only upon actuation of both of the pair of released actuators.

21 Claims, 5 Drawing Sheets

VACUUM-OPERATED VEHICLE GLASS HANDLING SYSTEM

BACKGROUND

The present disclosure generally relates to the handling of vehicle glass, including installation and/or removal of vehicle glass on a vehicle frame. More particularly, the present disclosure relates to a vacuum-operated vehicle glass handling system that enables more efficient and effective installation and/or removal of vehicle glass on a vehicle frame.

Automotive or vehicle glass, such as a vehicle windshield, can be installed using a device having an aluminum frame with a plurality of manual vacuum cups disposed thereon. This configuration enables a suction vacuum to be applied to the vehicle glass by merely pressing the vacuum cups thereagainst. For example, one or more operators position the aluminum frame over a sheet of vehicle glass and move the device toward the sheet so as to attach the vacuum cups thereto. As the vacuum cups are forced toward and into the glass sheet, a manual suction vacuum force is created between the vacuum cups and the glass sheet such that the glass sheet can be lifted and installed on a vehicle by manipulation of the aluminum frame.

SUMMARY

According to one embodiment, a vacuum-operated vehicle glass handling system is provided. More particularly, in accordance with this embodiment, the vacuum-operated vehicle glass handling system includes a plurality of suction cups movably disposed on a frame. A powered vacuum source is fluidly connected to the plurality of suction cups for providing a vacuum at each of the plurality of suction cups. The powered vacuum source includes a pair of vacuum pumps both fluidly connected to the plurality of suction cups for redundantly providing the vacuum to the plurality of suction cups. A power source is selectively electrically connected to the powered vacuum source. A pair of vacuum actuators is on the frame for selectively electrically connecting the power source to the powered vacuum source so the powered vacuum source can provide the vacuum at the plurality of suction cups. The power source is electrically connected to the powered vacuum source upon actuation of one or both of the pair of vacuum actuators. A pair of release actuators is on the frame for selectively releasing the vacuum provided at the plurality of suction cups. The vacuum is released only upon actuation of both of the pair of release actuators.

According to another embodiment, an automotive glass handling device is provided for removing or installing automotive glass, such as a vehicle windshield, of a vehicle. More particularly, in accordance with this embodiment, the automotive glass handling device includes a frame having at least one suction cup connected thereto for vacuum attachment to an automotive glass member. First and second vacuum pumps are each fluidly connected to the at least one suction cup for providing a powered vacuum to the at least one suction cup. The powered vacuum is provided redundantly for allowing the powered vacuum to be provided to the at least one suction cup by one of the first and second vacuum pumps should the other of the first and second vacuum pumps fail. A power source is selectively electrically connected to the first and second vacuum pumps for providing power thereto.

In accordance with yet another embodiment, an automotive glass handling device is provided. More particularly, in accordance with this embodiment, the automotive glass handling device includes a frame and a plurality of suction cups disposed in spaced relation on the frame. A powered vacuum source is fluidly connected to the plurality of suction cups for providing a vacuum at each of the plurality of suction cups. A power source is selectively electrically connected to the powered vacuum source. The automotive glass handling device further includes first and second vacuum actuators for selectively connecting the power source to the powered vacuum source so the powered vacuum source can provide the vacuum at each of the plurality of suction cups. The power source is electrically connected to the powered vacuum source upon actuation of at least one of the first and second vacuum actuators. The device additionally includes first and second release actuators for selectively releasing the vacuum provided at each of the plurality of suction cups. The vacuum is released only upon actuation of both the first and second release actuators.

DETAILED DESCRIPTION

Figure 1:
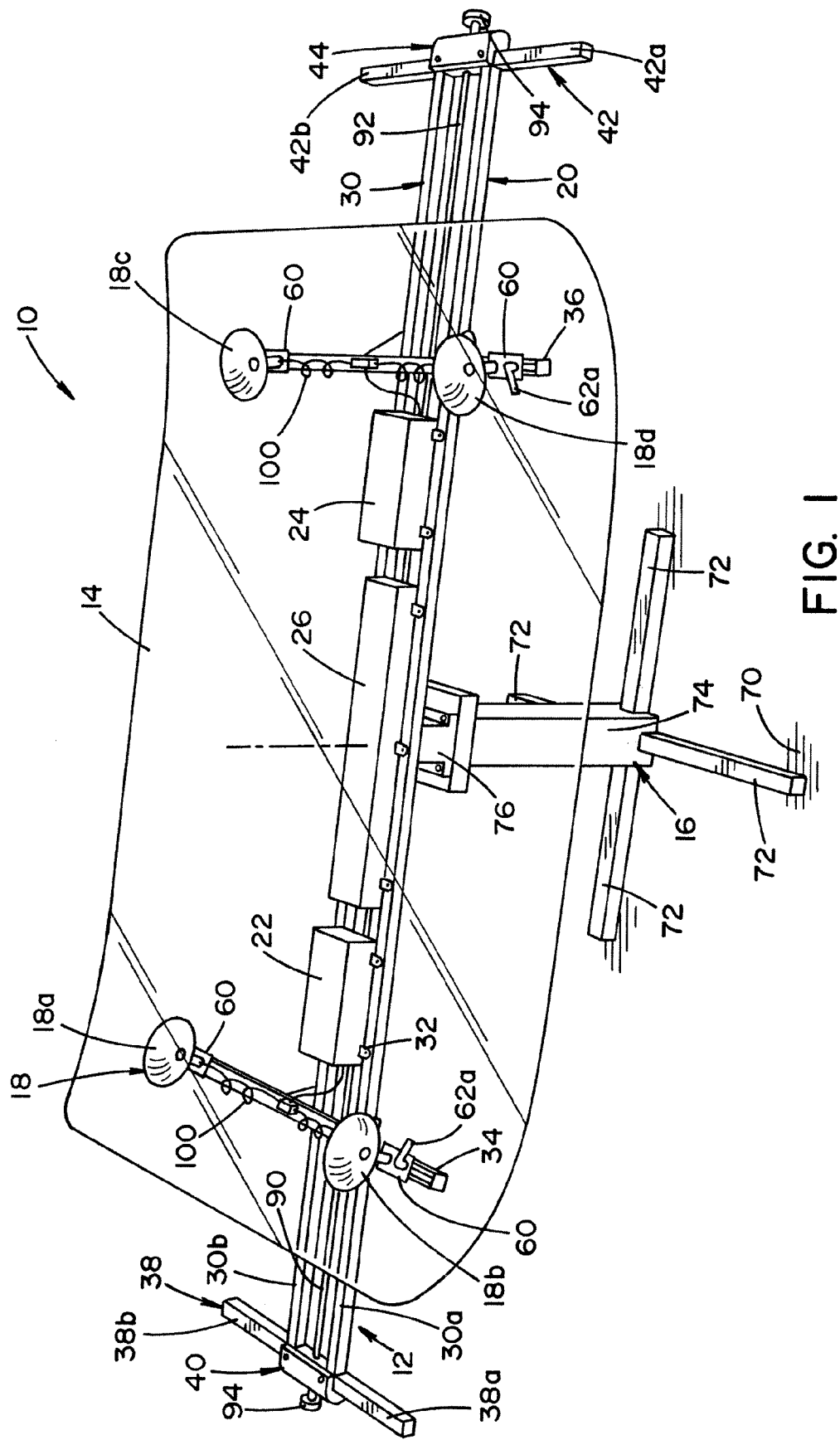
FIG. 1 is a perspective view of a vacuum-operated vehicle glass handling system including a vehicle glass handling device mountable on an associated stand and able to handle vehicle glass.

Referring now to the drawings wherein the showings are for purposes of illustrating one or more exemplary embodiments, FIG. 1 shows a vehicle glass handling system 10 including a vehicle glass handling device 12 for handling a sheet of vehicle glass 14. In one exemplary application, the device 10 can be used for installing and/or removing vehicle glass, such as a vehicle windshield, on a vehicle, or more particularly a vehicle frame. The system 10 can further include a stand or fixture 16 upon which the device 12 can be removably secured, including while the device 12 is holding vehicle glass 14. In the illustrated embodiment, the vehicle glass 14 is depicted as a vehicle windshield, but it is to be appreciated by those skilled in the art that the device 12 can be used to handle (i.e., including install and/or remove) other vehicle glass components of a vehicle including, for example, a vehicle's rear or side windows, a vehicle's sunroof, etc.

Figure 2:
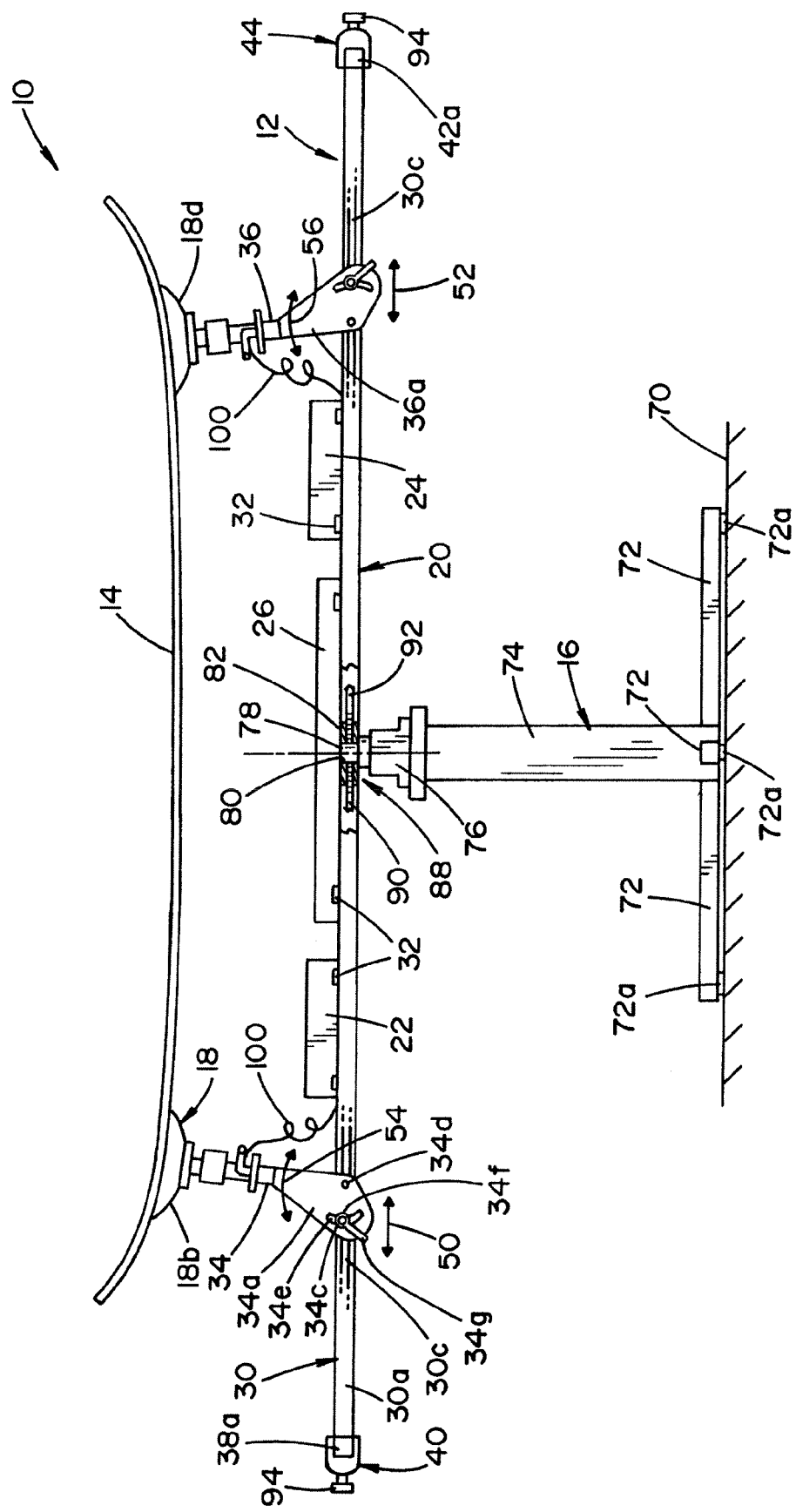
FIG. 2 is an elevational view of the vacuum-operated vehicle glass handling system of FIG. 1.

With additional reference to FIG. 2, the handling device 12, also referred to herein as an automotive glass handling device, includes at least one suction cup 18 connected to a frame 20 for vacuum attachment to vehicle glass 14 or any other automotive or vehicle glass member. In the illustrated embodiment, the at least one suction cup 18 is a plurality of suction cups, such as four suction cups 18a,18b,18c,18d, movably disposed in spaced relation on a frame 20. As will be described in more detail below, the handling device 12 further includes a powered vacuum source fluidly connected to the plurality of suction cups 18a-d for providing a powered vacuum at each of the plurality of suction cups 18a-d. In the illustrated embodiment, the powered vacuum source includes a pair of vacuum pump units 22,24 disposed on the frame 20 and both fluidly connected to all the suction cups 18a-d for redundantly providing said powered vacuum to the suction cups. As will be described in more detail below, each of the pump units 22,24 includes a vacuum pump and a motor for operating the vacuum pump (see pumps 22a,24a and motors 22b,24b illustrated in FIG. 5). The pump units 22,24 are selectively electrically connected to a power unit 26, which includes a power source 28 (FIG. 5), disposed on the frame 20 between the pump units 22,24, for providing power thereto.

Figure 3:
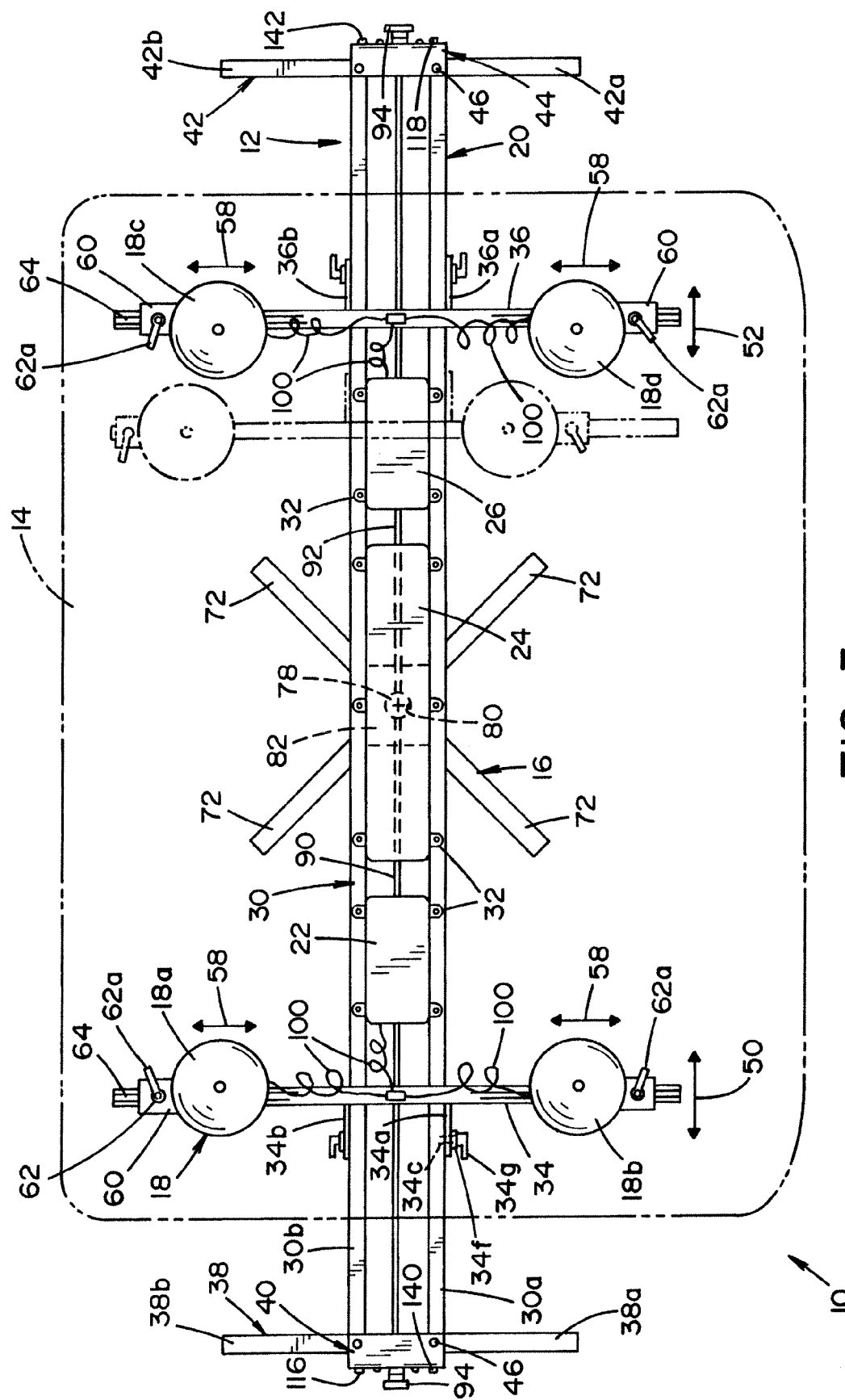
FIG. 3 is a plan view of the vacuum-operated vehicle glass handling system of FIG. 1.

With further reference to FIG. 3, the frame 20 of the handling device 12 includes an elongated main arm 30 upon which the pump units 22,24 and power unit 26 are mounted via any conventional mounting means, including incorporating mounting tabs 32 on the units 22,24,26 that can be mounted to the arm 30 by suitable fasteners, such as threaded members or bolts (not shown). The frame 20 further includes suction cup arms (two arms 34,36 in the illustrated embodiment) connected to and extending generally transversely relative to the main arm 30. In the illustrated embodiment, first suction cup arm 34 has two suction cups 18a,18b mounted thereto and second suction cup arm 36 has two suction cups 18c,18d mounted thereto.

As will be described in more detail below, each of the suction cup arms 34,36 are longitudinally and slidably movable along the main arm 30 (or a longitudinal length of the main arm) and each of suction cups 18a-d are longitudinally and slidably movable along respective or corresponding suction cup arms 34,46 (or respective longitudinal lengths of the suction cup arms). As will also be described in more detail below, the suction cup arms 34,36 are also angularly movable (i.e., pivotally movable in the illustrated embodiment) relative to the main arm 30 for angularly positioning the suction cups 18a,18b or 18c,18d mounted thereto relative to the main arm 30. Of course, alternative arrangements are contemplated, which could include any number of suction cup arms and any number of suction cups mounted to each suction cup arm, including differing numbers of suction cups mounted to each arm when two or more arms are employed.

In the illustrated embodiment, the frame main arm 30 is formed of two spaced apart elongated beams 30a,30b. A first handle beam 38 and a first control member or panel 40 are disposed at or adjacent a first end of the main arm 30, and more particularly at first ends of the elongated beams 30a, 30b. The first handle beam 38 is oriented approximately normal relative to the elongated main arm 30 and the control panel 40 is centrally mounted to the beam 38 so as to define handle portions 38a,38b easily grasped by one of the operators of the device 12. Similarly, a second handle beam 42 and a second control member or panel 44 are disposed at or adjacent a second, opposite end of the main arm 30, and more particularly at second ends of the elongated beams 30a,30b. The second handle beam 42 is also oriented approximately normal relative to the elongated main arm 30 and generally parallel relative to the first handle beam 38. The control panel 44 is centrally mounted to the beam 40 so as to define handle portions 42a,42b easily grasped by another of the operators of the device 12. Any suitable fastener or fastening means, such as hex-headed threaded fasteners 46, can be used to secure the handle beams 38,42 and main arm 30 together and to secure the control panels 40,44 to the beams 38,42 and/or arm 30.

As mentioned briefly above, the suction cup arms 34,36 are slidably movable along a longitudinal length of the main arm 30 (as indicated by arrows 50,52) and angularly movable relative to the main arm (as indicated by arrows 54,56). More particularly, the first suction cup arm 34 includes extension portions 34a,34b and the second suction cup arm 36 includes extension portions 36a,36b. The extension portions 34a-b and 36a-b are similarly constructed and operate in a like manner so only extension portion 34a need be briefly described in further detail herein as those skilled in the art will appreciate and understand the construction and operation of the remaining portions 34b and 36c-d based on the further description of portion 34a.

First and second pins 34c,34d secure the extension portion 34a to the main beam 30. The pins 34c-d are received in a guiding slot 30c defined in and along one side of the main arm 30 and more particularly beam 30a. The pins 34c-d are slidable along the guiding slot 30c to move the arm 34 longitudinally along the main arm 30 as indicated by arrow 50. The first pin 34c is also slidably movable along slot 34e defined in the extension portion 34a to pivotally or angularly move the arm 34 relative to the main arm 30 about the second pin 34d, which defines a pivot axis, as indicated by arrow 54. The first pin 34c includes a locking assembly 34f that allows for selective locking of the longitudinal and angular positions of the arm 34 relative to the main arm 30. The locking assembly can be a conventional locking assembly that locks the aforementioned positions when the pin 34c is rotated clockwise, which can be facilitated by pin handle 34g, and unlocks by rotating pin 34c counterclockwise.

With specific reference to FIGS. 2 and 3, the suction cups 18a-d are each slidably movable along their respective or corresponding suction arms 34,36 as indicated by arrows 58. Since the suction cups 18a-d are similarly constructed and mounted to the arms 34,36, only suction cup 18a is described in further detail herein as the like construction and mounting of the other suction cups will be understood and appreciated by those skilled in the art. In the illustrated embodiment, suction cup 18a is secured to and extends from a mounting plate 60. The mounting plate 60 is slidably connected to its corresponding arm 34 by a pin 62 that is slidably received within a slot 64 defined in an upper side of the arm. The slidable mounting of the pin 62 within the slot 64 enables the suction cup 18a to be slidably movable along a longitudinal length of the suction cup arm 34 as indicated by arrow 58. Like the pin 34c, the pin 62 can include a locking assembly (not shown) and a handle portion 62a to facilitate operation of the locking assembly.

As illustrated, the frame 20, and thus the device 12, are rotatably (and removably) mountable on the stand 16, which can balance the device 12 and vehicle glass 14 held by the device 12 on a support surface 70. For such balancing, the stand 16 includes legs 72, which can include feet 72a, extending outwardly along the support surface 70 from a tower portion 74. Raised from the support surface 70, the tower portion 74 carries a mounting structure 76 to which the frame 20 and therefore the device 12 are removably mounted or secured. The mounting structure 76 includes a stepped shaft 78 that is received within a receiving aperture 80 defined in a mounting or mating structure 82 carried by the frame 20 between the main arm beams 30a,30b and disposed adjacent or below the power unit 26. Thus, the mating structure 82 and its aperture 80 cooperatively mate with the mounting structure 76 and specifically the stepped shaft 78 so as to cooperatively mount (removably and rotatably) the frame on the stand 16. Although not shown in the illustrated embodiment, the mating structure 82 can include a relatively thin board structure extending between the handle beams 38,42 and the beams 30a,30b, while being disposed immediately adjacent and below the beams 30a,30b. A ring structure, such as a sintered bronze bushing, can be carried by this board structure for receiving the stepped shaft 78 when removably and rotatably mounting the device 12 on the stand 16.

In the illustrated embodiment, the frame 20 includes or carries a brake assembly 88 for selectively locking the device 12 to the stand 16 so as to prevent relative rotation therebetween. The brake assembly 88 includes at least one elongated rod, two elongated rods 90,92 in the illustrated embodiment, threadedly received through the mating structure 82. Forward rotation (e.g., clockwise) of the one or both of the rods 90,92 causes the rotated rod to move radially toward and into the stepped shaft 78 so as to frictionally engage the shaft 78 and prevent rotation of the device 12 about the stand 16. As shown, the rods 90,92 can extend from the aperture 80 to a respective one of the control panels 40,44 for allowing rotation of the rod from control panel. Of course, many alternative braking assemblies or devices for selectively preventing rotation between the device 12 and the stand 16 can be substituted for the one or ones shown and/or described herein and all such assemblies and devices should be considered within the scope of the embodiment herein described. For example, one of both of the rods 90,92 could be used to radially constrict an annular bearing about the shaft to lock rotation relative to the stand 16.

Figure 4:
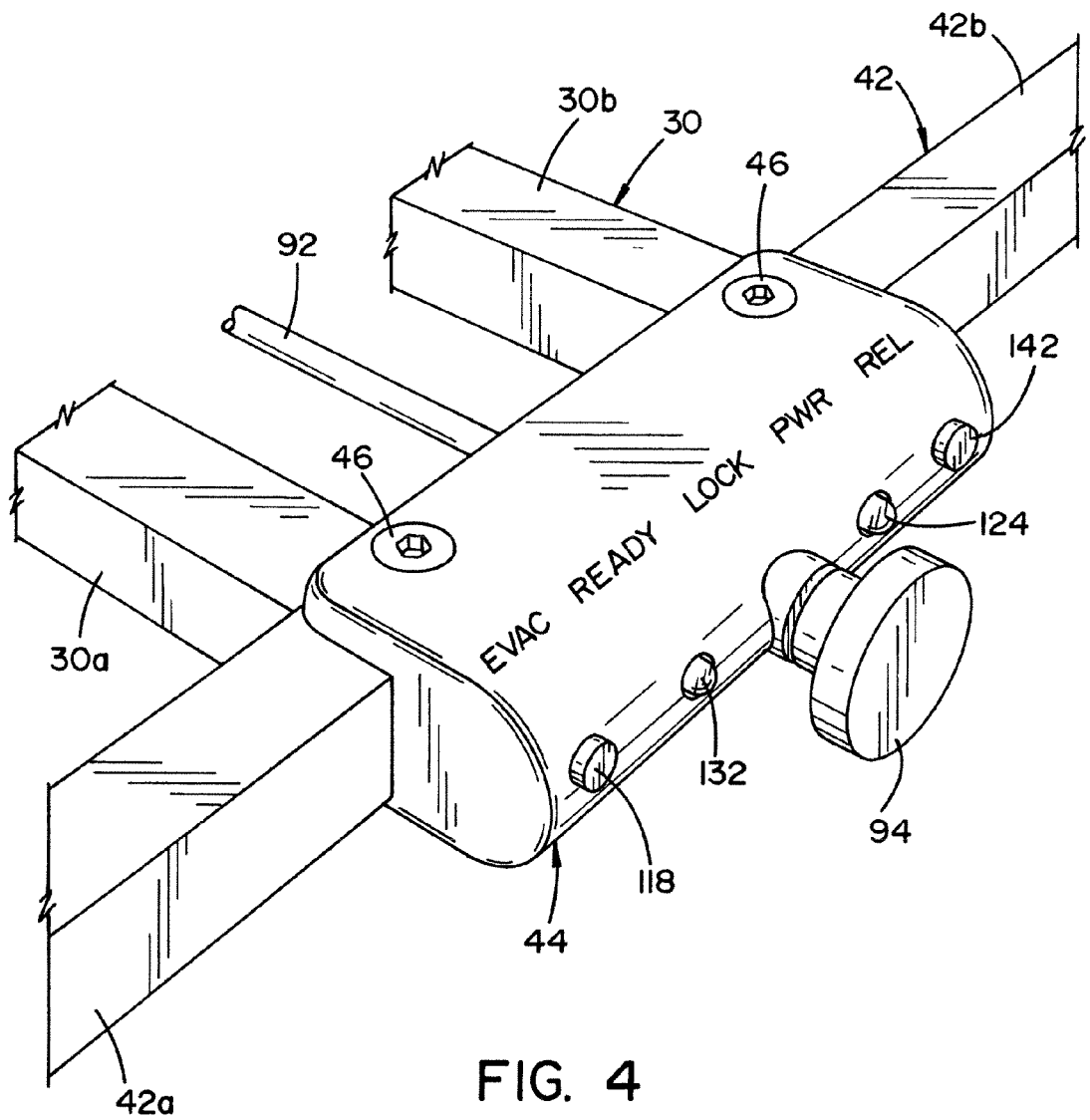
FIG. 4 is a partial enlarged view of a control unit provided on the vehicle glass handling device of FIG. 1.

Turning to FIG. 4, control panel 44 is enlarged and shown in greater detail. As will be appreciated and understood by those skilled in the art, control panel 44 is representative of both control panels 40,44 and further description of panel 44 should be considered applicable to control panel 40, unless otherwise indicated. As will be described in more detail below, the control panel 44 includes controls for operating the vacuum device 12 and indicators for displaying states or conditions of the vacuum device. Appropriate indicia (e.g., word markings or labels, graphics, designs or symbols) can be associated with each control and/or indicator, such as the abbreviated word markings shown in FIG. 4 in connection with the illustrated embodiment. The panel 44 further includes a knob 94, also referred to herein as a rotation brake, secured to rod 92 and facilitating easier rotation thereof.

Figure 5:
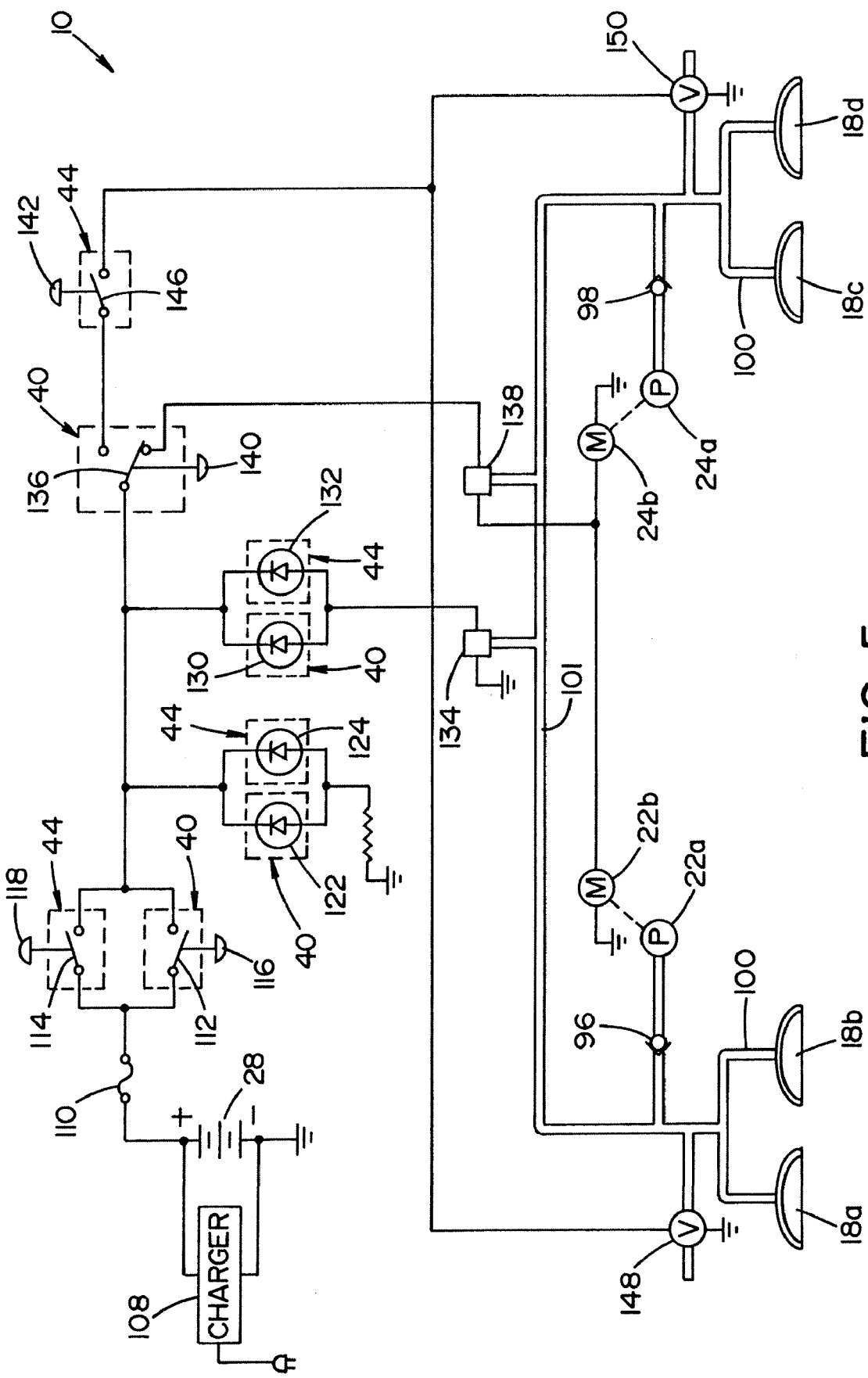
FIG. 5 is a schematic view of the vehicle glass handling device of FIG. 1 showing the electric and pneumatic circuits thereof.

With additional reference to FIG. 5, the vacuum source, i.e., the pumps 22a,24a, are schematically shown in fluid communication with the plurality of suction cups 18a-d. The pumps 22a,24a are operatively connected to pump motors 22b,24b such that the pumps are powered by the motors when current (i.e., power) is supplied to the motors. Powering of the pumps 22a,24a causes a vacuum, and more particularly a powered vacuum, to be created at the suction cups 18a-d. As shown, one-way check valves 96,98 can be fluidly disposed respectively between the pumps 22a,24a and the suction cups 18a-d to prevent backpressure from entering the fluid lines between the pumps and the suction cups, particularly when the pumps are not operating (i.e., the check valves 96,98 maintain any created vacuum at the suction cups 18a-d even when the pumps are not operating).

Conventional fluid lines, such as fluid lines 100 depicted in FIGS. 1 and 3, can be used for fluidly connecting the pumps 22a,24a, and more particularly the pump units 22,24 housing the pumps, to the suction cups 18a-d as illustrated schematically in FIG. 5, along with suitable fittings, couplings and any other appropriate fluid communication components. Although not illustrated in FIGS. 1 and 3, a fluid line 101 can be used to fluidly connect the pump units 22,24 to one another, as schematically shown in FIG. 5, for purposes of redundantly providing powered vacuum to each of the suction cups 18a-d. The fluid line 101 connecting the pump units 22,24 can be disposed within one of the main arm beams 30a,30b. More particularly, as shown in FIG. 5, the pump 22a is fluidly connected to all the suction cups 18a-d and the pump 24a is fluidly connected to all the suction cups 18a-d. By this arrangement, when driven by the pump motors 22b,24b, one or both of the pumps 22a,24a can provide a powered vacuum to the suction cups 18a-d and thus powered vacuuming can be maintained even in the event of failure of one of the pumps.

The power source 28, housed in the power unit 26, selectively provides current (i.e., power) to the motors 22b,24b for driving the pumps 22a,24a. The power source 28 can be a rechargeable battery (or batteries) contained within the power unit 26, which provides greater freedom of movement to the device 12 due to the lack of a power cord. When the power source 28 is a rechargeable battery, as will be known and understood by those skilled in the art, the power unit 26 can additionally include a conventional charger 108 for recharging the rechargeable battery power source 28. Although not illustrated, a main or master power switch can be included on the device 12 for preventing power from passing thereby unless the main power switch is in a closed position.

Provided the main power switch is on (i.e., in the closed position), the power source 28 is selectively electrically connected to the motors 22b,24b (shown schematically in FIG. 5) for driving the pumps 22a,24a (both the pumps and the motors being housed in the pump units 22,24 in the illustrated embodiment). More particularly, current from the power source 28 is, after passing through fuse 110, guided through one or both of a pair of switches 112,114. That is, current from the power source 28 is allowed to pass and be sent toward the motors 22b,24b only when one or both of switches 112,114 are closed. The switches 112,114 are closed when a vacuum actuator 116 or 118 associated with a particular switch is actuated. As illustrated, the first vacuum actuator 116 is associated with the first switch 112 and the second vacuum actuator 118 is associates with the second switch 114. Thus, the actuators 116,118 selectively electrically connect the power source 28 to the pump motors 22b,24b to operate the pumps 22a,24a (i.e., the powered vacuum source) so the pumps can provide a powered vacuum at the suction cups 18a-d.

In the illustrated embodiment, the vacuum actuators 116, 118 are push-button actuators disposed on the frame 20 and, more particularly, respectively disposed on the control panels 40,44. Although not illustrated in FIGS. 1-4, the control panels 40,44 are operatively connected, including electrically connected, to the units 22-26 for controlling operation of the device 12 as described herein. Electrical connections between the control panels 40,44, the pump units 22,24 and the power unit 26 can be disposed within one or both of the main arm beams 30a,30b. In one example, the actuator 118 that operates to close switch 114 upon actuation is a pushbutton on the panel 44 shown in FIG. 4. Since the switches 112,114 are disposed electrically in parallel relation, depression of either or both push-button actuators 116,118 operates to electrically connect the pump motors 22b,24b to the power source 28 and thereby operate the pumps 22a,24a to create a powered vacuum at each of the suction cups 18a-d. The pushbutton actuators 116,118 can be momentary switches that are simply depressed to toggle the associated switches 112,114 between open and closed positions.

When one or both of the switches 112,114 is closed (as well as a main power switch, if employed), power or current is also directed to a pair of diodes 122,124, which can be contained respectively within the control panels 40,44 to indicate power is being sent through the switches 112,114 toward the pump motors 22b,24b. For example, diode 124 can be a power light on the control panel 44. Current is also directed through diodes 130,132, but only when pressure or vacuum-operated switch 134 senses a pressure (or vacuum) of an appropriate amount at the vacuum cups 18a-d. In one embodiment, the pressure switch 134, which is in fluid communication with the suction cups 18a-d, can be set to close (and allow current to pass through the diodes 130,132) when pressure is sensed to be at least 19 in/Hg and set to open (and prevent current from passing through the diodes 130,132) when pressure falls below 16 in/Hg. Like the diodes 112,114, the diodes 130,132 can be oppositely disposed, one each, within the control panels 40,44 to indicate by illumination that sufficient vacuum exists at the suction cups 18*a-d* for carrying vehicle glass 14. For example, diode 132 can be a ready light in FIG. 4 on control panel 44.

Switch 136, operation of which will be described in further detail below, is normally (for example, urged or biased by a spring) in the illustrated first closed position (i.e., directing any current toward the pump motors 22*b*,24*b*). When one of the switches 112,114 is closed and switch 136 is its normal position, current to the motors 22*b*,24*b* is regulated by a pressure or vacuum-operated switch 138, also referred to herein as a pressure monitoring and switch device. The pressure switch 138, which is in fluid communication with the suction cups 18*a-d*, senses the pressure (or vacuum) at the suction cups 18*a-d* and, based on the sensed pressure, operates or functions to cycle the pump motors 22*b*,24*b*. For example, in one embodiment, the pressure switch 138 can be set to close (and allow current to pass through to the motors 22*b*,24*b*) when the pressure falls below a predetermined set pressure, such as 16 in/Hg. The pressure switch 138 can also be set to cycle off the motors 22*b*, 24*b* (i.e., cut off current) so as to prevent overworking of the motors when pressure or vacuum at the suction cups 18*a-d* is greater than a predetermined set pressure, such as 16 in/Hg.

To separate vehicle glass 14 from the suction cups 18*a-d*, the device 12 includes a pair of release actuators 140,142 for selectively releasing the vacuum provided at the suction cups 18*a-d*. As will be described more fully herein, the vacuum at the suction cups 18*a-d* is only released by the actuators 140, 142 upon actuation of both actuators. The first release actuator 140 can be disposed on the control panel 40 and the second actuator 142 can be disposed in spaced relation relative to the first actuator on the control panel 44. Like the actuators 116, 118, the release actuators 140,142 can be separately disposed push-button actuators on the frame 20, and more particularly on the control panels 40,44, that actuate on depression. For example, the release actuator 142 can be a pushbutton on the panel 44 shown in FIG. 4.

The release actuators 140,142 operate switch 136 and switch 146. More particularly, the release actuator 140 is associated with switch 136 and, upon actuation, operates to move switch 136 from the illustrated first closed position to a second closed position (against a spring force or urging) wherein current is directed toward release valves 148,150 instead of pressure switch 138. The release actuator 142 is associated with switch 146 and, upon actuation, operates to move switch 146 to a closed position from a normally open position (into which the switch 146 can be urged or biased) wherein current is further directed (when switch 136 is in the second closed position) to the release valves 148,150. As illustrated, the valves 148,150 are fluidly connected to the suction cups 18*a-d* and able to fluidly connect said suction cups 18*a-d* to atmosphere or ambient when in an open position to release any vacuum, such as a powered vacuum created by pumps 22*a*,24*a*, from the suction cups 18*a-d*. Although the illustrated device 12 is depicted with two release valves, it is to be appreciated by those skilled in the art that the two release valves could be easily replaced with a single valve and thereby achieve the same functionality as the illustrated device 12.

In the illustrated embodiment, the valves 148,150 can be powered solenoid operated valves that move to respective open positions when current is delivered thereto and thereby release any powered vacuum from the suction cups 18*a-d*. To electrically connect the solenoid valves 148,150 to the power source 28, the first and second actuators 140,142 have to both be actuated which causes switch 136 to move to the second closed position and switch 146 to move to the closed position. With both switches in the proper position, current is able to flow to the valves 148,150 and open the same to atmosphere. Thus, actuation of both release actuators 140,142 electrically connects the valves 148,150 to the power source 28 (provided one of switches 112,114 is closed) and any vacuum created by the motors 122*b*,124*b* and the pumps 122*a*,124*a* is released from the suction cups 18*a-d*. Requiring both actuators 140, 142 to be actuated (i.e., depressed when the actuators are push-button actuators) prior to releasing the vacuum at the cups 18*a-d* to atmosphere is a safety feature that eliminates or substantially reduces the likelihood of the vacuum being inadvertently released by a single operator of the device 12 or released without the knowledge of both operators of the device 12. Thus, requiring two actuators to release the vacuum ensures that vacuum release is intentional and that both operators of the device 12 are in agreement as to the timing of the vacuum release.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vacuum-operated vehicle glass handling system, comprising:
   a plurality of suction cups movably disposed on a frame;
   a powered vacuum source fluidly connected to said plurality of suction cups for providing a vacuum at each of said plurality of suction cups, said powered vacuum source including a pair of vacuum pumps both fluidly connected to said plurality of suction cups for redundantly providing said vacuum to said plurality of suction cups;
   a power source selectively electrically connected to said powered vacuum source;
   a pair of vacuum actuators on said frame for selectively electrically connecting said power source to said powered vacuum source so said powered vacuum source provides said vacuum at said plurality of suction cups, said power source electrically connected to said powered vacuum source upon actuation of one or both of said pair of vacuum actuators; and
   a pair of release actuators on said frame for selectively releasing said vacuum provided at said plurality of suction cups, said vacuum released only upon actuation of both of said pair of release actuators.

2. The vacuum-operated vehicle glass handling system of claim 1 further including a first control member disposed on said frame and including said first vacuum and said first release actuators as separate push-button actuators and a second control member disposed on said frame and including said second vacuum and said second release actuators as separate push-button actuators.

3. The vacuum-operated vehicle glass handling system of claim 2 further including at least one release valve fluidly connected to said plurality of suction cups, said release valve fluidly connecting said plurality of suction cups to atmosphere when in an open position to release said vacuum from said plurality of suction cups.

4. The vacuum-operated vehicle glass handling system of claim 1 wherein said power source is a rechargeable battery mounted on said frame.

5. The vacuum-operated vehicle glass handling system of claim 1 said frame includes:
an elongated main arm; and
suction cup arms connected to and extending generally transversely relative to said main arm, each of said suction cup arms having at least two suction cups of said plurality of suction cups mounted thereto, being longitudinally movable along said main arm, and further being angularly movable relative to said main arm, each of said two suction cups being longitudinally movable along a corresponding suction cup arm.

6. The vacuum-operated vehicle glass handling system of claim 5 wherein said frame is rotatably mountable on an associated stand, said frame has a mating structure that cooperatively mounts said frame on said associated stand, said frame further having a brake assembly for selectively preventing rotation of said frame relative to said associated stand.

7. The vacuum-operated vehicle glass handling system of claim 1 further including a pressure monitoring and switch device in fluid communication with said plurality of said suction cups for sensing a vacuum pressure of said plurality of said suction cups, said pressure monitor and switch device cycling said powered vacuum source when said vacuum pressure is sensed to be below a predetermined set pressure.

8. An automotive glass handling device for removing or installing automotive glass of a vehicle, comprising:
a frame having at least one suction cup connected thereto for vacuum attachment to an automotive glass member;
at least one vacuum pump fluidly connected to said at least one suction cup for providing a powered vacuum to said at least one suction cup;
a rechargeable battery mounted on said frame and selectively electrically connected to said at least one vacuum pump for providing power thereto; and
a pair of release actuators disposed on said frame for selectively releasing said vacuum at said at least one suction cup, said vacuum released only upon actuation of both of said pair of release actuators.

9. The automotive glass handling device of claim 8 wherein said at least one suction cup is a plurality of suction cups disposed in spaced relation on said frame.

10. A vehicle glass handling device for removing or installing vehicle glass, comprising:
a frame having at least one suction cup connected thereto for vacuum attachment to an automotive glass member;
first and second vacuum pumps each fluidly connected to said at least one suction cup for providing a powered vacuum to said at least one suction cup, said powered vacuum provided redundantly for allowing said powered vacuum to be provided to said at least one suction cup by one of said first and second vacuum pumps should the other of said first and second vacuum pumps fail;
a power source selectively electronically connected to said first and second vacuum pumps for providing power thereto;
first and second vacuum actuators for selectively connecting said power source electrically to said first and second vacuum pumps to provide said powered vacuum redundantly to said at least one suction cup, said power source electrically connected to said first and second pumps upon actuation of either or both of said first and second vacuum actuators;
at least one release valve fluidly connected to said at least one suction cup for releasing said powered vacuum from said at least one suction cup; and
first and second release actuators for selectively opening said at least one release valve to release said powered vacuum from said at least one suction cup, actuation of both said first and second release actuators required to open said at least one release valve to release said powered vacuum from said at least one suction cup.

11. The automotive glass handling device of 10 further including a first control member disposed on said frame that includes said first vacuum and said first release actuators as separate push-button actuators and a second control member disposed on said frame that includes said second vacuum and said second release actuators as separate push-button actuators.

12. The automotive glass handling device of claim 11 wherein said frame includes an elongated main arm having said first control member mounted adjacent a first end of said main arm and said second control member mounted adjacent a second end of said main arm, said frame further including suction cup arms extending transversely relative to said main arm, at least two suction cups mounted to each of said suction cup arms and said suction cup arms slidably movable along a longitudinal length of said main arm.

13. The automotive glass handling device of claim 12 wherein each of said at least two suction cups mounted to each of said suction cup arms is slidably movable along a longitudinal length of a corresponding suction cup arm of said suction cup arms.

14. The automotive glass handling device of claim 12 wherein said suction cup arms are angularly movable relative to said main arm for angularly positioning said at least two suction cups mounted thereto relative to said main arm.

15. The vehicle glass handling device of claim 10 wherein said power source is a rechargeable battery mounted on said frame.

16. An automotive glass handling device, comprising:
a frame;
a plurality of suction cups disposed in spaced relation on said frame;
a powered vacuum source fluidly connected to said plurality of suction cups for providing a vacuum at each of said plurality of suction cups;
a power source selectively electrically connected to said powered vacuum source;
first and second vacuum actuators for selectively connecting said power source to said powered vacuum source so said powered vacuum source provides said vacuum at each of said plurality of suction cups, said power source electrically connected to said powered vacuum source upon actuation of at least one of said first and second vacuum actuators; and
first and second release actuators for selectively releasing said vacuum provided at each of said plurality of suction cups, said vacuum released from each of said plurality of suction cups only upon actuation of both said first and second release actuators, wherein said first and second release actuators release said vacuum by, upon actuation, electrically connecting said power source to at least one powered solenoid valve that fluidly connects said suction cups to atmosphere to release said vacuum from said plurality of suction cups.

17. The automotive glass handling device of claim 16 wherein said vacuum source is a pair of pumps that redundantly provide said vacuum at each of said plurality of suction cups such that, if one of said pair of pumps fails, the other of said pair of pumps continues to provide said vacuum at each of said plurality of suction cups.

18. The automotive glass handling device of claim 16 wherein said power source is a rechargeable battery mounted on said frame.

19. An automotive glass handling device comprising:
   a frame;
   a plurality of suction cups disposed in spaced relation on said frame;
   a powered vacuum source fluidly connected to said plurality of suction cups for providing a vacuum at each of said plurality of suction cups;
   a power source selectively electrically connected to said powered vacuum source;
   first and second vacuum actuators for selectively connecting said power source to said powered vacuum source so said powered vacuum source provides said vacuum at each of said plurality of suction cups, said power source electrically connected to said powered vacuum source upon actuation of at least one of said first and second vacuum actuators;
   first and second release actuators for selectively releasing said vacuum provided at each of said plurality of suction cups, said vacuum released from each of said plurality of suction cups only upon actuation of both said first and second release actuators; and
   a first control member on one end of said frame and a second control member on an opposite end of said frame, said first vacuum actuator and said first release actuator disposed on said first control member, and said second vacuum actuator and said second release actuator disposed on said second control member.

20. The automotive glass handling device of claim 19 wherein said first vacuum and first release actuators are separately disposed push-button actuators that actuate on depression, and said second vacuum and said second release actuators are separately disposed push-button actuators that actuate upon depression.

21. An automotive glass handling device for removing or installing automotive glass of a vehicle, comprising:
   a frame having at least one suction cup connected thereto for vacuum attachment to an automotive glass member;
   first and second vacuum pumps fluidly connected to said at least on suction cup for providing a powered vacuum to said at least one suction cup, and wherein said powered vacuum is provided redundantly for allowing said powered vacuum to be provided to said at least one suction cup by one of said first and second vacuum pumps should the other of said first and second vacuum pumps fail;
   a power source selectively electrically connected to said first and second vacuum pumps for providing power thereto; and
   a pair of release actuators disposed on said frame for selectively releasing said vacuum at said at least one suction cup, said vacuum released only upon actuation of both of said pair of release actuators.

* * * * *